(12) United States Patent
Martinello

(10) Patent No.: US 7,927,481 B2
(45) Date of Patent: Apr. 19, 2011

(54) SYSTEM FOR THE RECOVERY OF WASHING LIQUIDS USED IN SHOWERS, WASH BASINS AND/OR BATHS

(76) Inventor: Settimo Martinello, Appiano (IT)

( * ) Notice: Subject to any disclaimer, the term of this patent is extended or adjusted under 35 U.S.C. 154(b) by 525 days.

(21) Appl. No.: 12/076,626

(22) Filed: Mar. 20, 2008

(65) Prior Publication Data

US 2008/0245713 A1    Oct. 9, 2008

(30) Foreign Application Priority Data

Apr. 5, 2007 (IT) .............................. BZ2007A0018
Aug. 23, 2007 (IT) .............................. BZ2007A0029

(51) Int. Cl.
*E03B 1/04* (2006.01)
(52) U.S. Cl. ......... 210/127; 210/128; 210/114; 210/115
(58) Field of Classification Search .................. 210/123, 210/127, 128, 114, 115; 4/665
See application file for complete search history.

(56) References Cited

FOREIGN PATENT DOCUMENTS

| DE | 4134272 A1 | * | 4/1993 |
| DE | 4202088 A1 | * | 7/1993 |
| DE | 4205305 A1 | * | 8/1993 |
| DE | 19519209 | | 12/1996 |

* cited by examiner

*Primary Examiner* — Terry K Cecil
(74) *Attorney, Agent, or Firm* — Jacobson Holman PLLC

(57) ABSTRACT

System for the recovery of washing liquids used in showers, wash basins, and/or baths, including a first decantation tank provided with at least one inlet connected to a downflow point of washing water, a second collection tank, an overflow partition wall adapted to separate the two tanks, a sewer drainage at the bottom of the decantation tank, adapted to be closed by a plug that can be raised by a float in the collection tank according to the liquid level therein, a drawing pump in the collection tank, controllable by a relay, or electrical float, indicating the liquid requirements of a fixture, a pipe connecting the pump of the collection tank with the fixture, the relay, or electric float, electrically connected with the pump and a valve of the fixture and controlled by a float in the collection tank for closing the electrical power supply to the pump and opening the electrical power supply of a valve for liquid flow to the fitting.

8 Claims, 2 Drawing Sheets

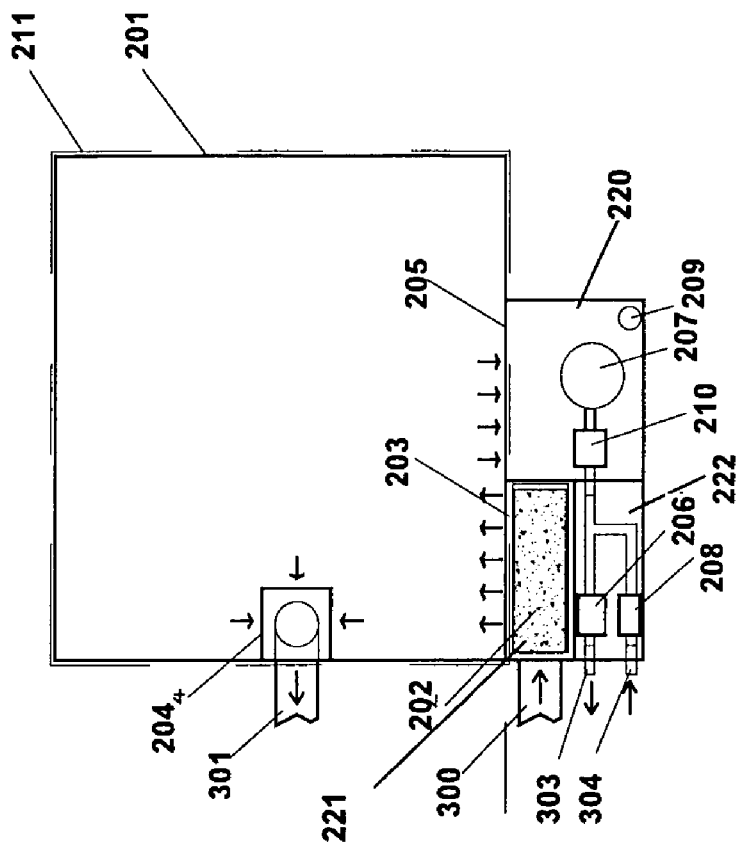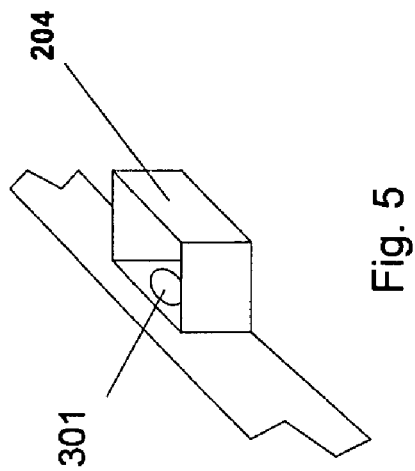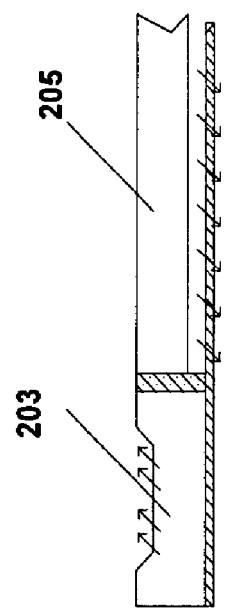

us 7,927,481 B2

SYSTEM FOR THE RECOVERY OF WASHING LIQUIDS USED IN SHOWERS, WASH BASINS AND/OR BATHS

FIELD OF THE INVENTION

The present invention relates to a system for the recovery of washing liquids used in showers, wash basins and/or baths.

BACKGROUND OF THE INVENTION

The domestic consumption of water in Italy is about 200 litres per person per day.

Of these, 28% (about 50 litres/day) are disposed by using the toilet flush. The patent is intended to build a simple mechanical/electrical system allowing the water from the wash basin and shower drainage to be collected and recycled for use in the toilet flush.

In DE 41 34 272 a system is described for recycling water in the home or in industry, wherein water used by a bath tub, shower or washing machine is collected in a container and stored for subsequent use, wherein a distribution container is connected through a pipe and a pump placed in between with a reservoir, wherein, in addition to the distribution container, the downflow of the bath is connected, the downflow of the shower and the downflow of the washing machine, wherein a level switch is provided on the distribution container in connection with the pump through an electrical line, in the duct (15) leading from the reservoir to the bowl leaving a valve in between that can be activated manually and is connected likewise with the fresh water duct, the valve having such means leaving a small amount of fresh water to flow into the toilet bowl after the necessary amount of recycled water has flowed through.

Also in the German patent application DE 42 02 088 a system for recycling water in the home or in industry is described, wherein water used by the bath, shower or washing machine is collected in a container and stored for subsequent use, wherein one or more reservoirs are connected with one or more dosing containers for the flush, in the outlet of the dosing container or in the duct between the dosing container and toilet bowl, a manually or electrically operated valve being inserted in the pipe from the reservoir to the dosing container, a pump being placed in between, and a device for colouring and/or odourant or disinfectant also being provided.

The systems of the above-mentioned type have the primary drawback of not having a minimum separation of dirty solid particles from the liquid to be re-used. Furthermore, the systems of the known type are rather complicated in their embodiment and not very flexible to use.

SUMMARY OF THE INVENTION

The object of the present invention is hence to solve the problems of the known systems.

A further object is to make systems of this type compact and easy to maintain.

This object is obtained by a system for the recovery of washing liquids used in showers, wash basins and/or baths.

An improvement of the Save Water System reaches the following technical advantages.

It eliminates the float system for opening the drainage plug, hence simplifying the operation. The drainage, in fact, takes place simply through the "overflow" tank 204.

It allows all the operating parts of the container to be placed under the shower tray, in particular the relay 206 and the valve 208, which were previously positioned in the toilet tank, now in an easily maintainable area 220 and 222.

BRIEF DESCRIPTION OF THE DRAWINGS

Further details and features are shown in the claims and in the description of the preferred embodiment examples, depicted in the attached drawing, wherein

DETAILED DESCRIPTION OF THE PREFERRED EMBODIMENTS

Figure 1:
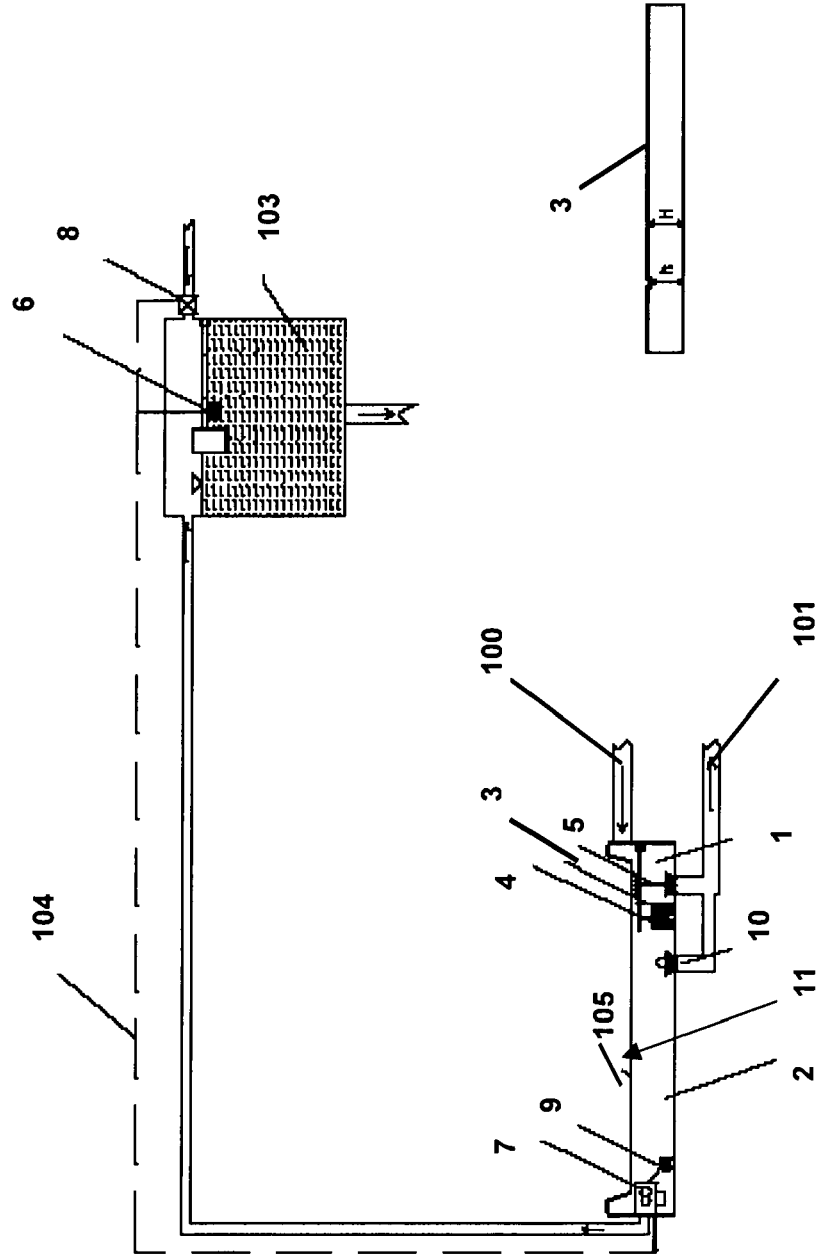
FIG. 1 represents a layout of a system for the recovery of washing liquids used in showers, wash basins and/or baths and FIG. 2 a front view of a detail used in the system of FIG. 1, FIG. 3 a schematic top view of a system for the recovery of washing liquids used in showers, wash basins and/or baths, FIG. 4 a detail of FIG. 3 in an elevation schematic view highlighting its operation and FIG. 5 a schematic perspective view of a drainage of the system according to the invention.

FIG. 1 shows the overview of a system for the recovery of washing liquids used in showers, wash basins and/or baths. This comprises a first tank 1 adapted to decant a drainage liquid and provided with at least an inlet 100 connected to a downflow point of washing water. The decantation tank 1 slopes towards the drainage 5 such as to promote the discharging of the "heavy dirt". This also comprises a second tank 2 for collecting liquid coming from the tank 1. An overflow partition wall 3 separates the two tanks 1 and 2. For the downflow of liquid and decanted particles a sewage drainage 101 is provided in the bottom of the decantation tank 1 provided with a plug 5 that can be raised using a float 4 in the collection tank 2 according to the liquid level therein. A drawing pump 7 provided in the collection tank 2 is controllable using a relay 6 indicating the liquid requirements of a fixture 103, in this case a toilet bowl. A pipe 104 connects the pump 7 of the collection tank 2 with the fixture 103. The relay 6 is electrically connected with the pump 7 and a valve 8 of the fixture 103 and is controlled by a float 9 in the collection tank 2 for closing the electrical power supply to the pump 7 and opening the electrical power supply of a valve 8 for an inflow of liquid to the fixture 103.

The system provides to collect the drainage water from the shower and wash basin in a flat tank placed under the shower tray 105. When the flush is used the water refill takes place taking it from the collection tank 2, through the electric pump 7, and at the same time closing the normal supply of the flush through an electric valve 8. Should the recycled water not be sufficient, the valve 8 will automatically open and the toilet tank 103 will be filled with the water from the normal circuit.

The drainage water coming from the shower and/or the wash basin passes first through a small decantation tank 1 which, when it is full, allows overflowing into the collection tank up to an approximate amount of 50-80 litres allowing the use of 6-10 toilet drainages.

When the collection tank 2 is full, through a simple floating lever system (or other), the sewer drainage opens, allowing the decantation tank to be drained containing the dirt coming from the drainages (hair, etc.).

As long as the collection tank is full, the drainages can go directly to the sewers as the float allows the drainage 101 to be kept constantly open.

The drainage water from the wash basin and the shower go into the decantation tank 1. When it is full, the water overflows into the collection tank 2 through the partition 3. When the collection tank 2 is full, the float 4 pushes the lever upwards opening the drainage plug to the sewers 5 allowing the water collected in the decantation tank to flow out, taking the dirt with it.

When the water of the toilet flush is used, the normal float is lowered and an electrical relay 6 is activated, or an electrical float, controlling the supply and at the same time closing the supply valve 8 of normal water.

The pump 7 supplies the toilet tank with the recycled water until the relay, or electrical float, controls the stop because the tank is full.

Should the recycled water in the tank 2 not be sufficient to fill the toilet tank, the float 9 automatically closes the electrical power supply to the pump 7 and to the valve 8, hence allowing the water of the normal circuit to complete the filling up.

Figure 2:
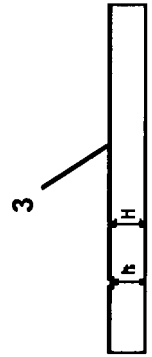

Other details:

- The overflow partition has a small notch which lowers the height from H to h; because the part of the "heavy dirt" of the water remains in the bottom of the decantation tank 1, through offsetting the water that has reached height H before opening the drainage plug 5, it can subsequently make the higher part of the water flow passing from H to h, hence eliminating the "light dirt" parts (froth, lighter elements of the water). The purification operation will be completed as above, allowing very clean water to be put into the circuit.
- The shower tray will have a flat upper part, or part of it, removable from above, allowing the cleaning or maintenance operations of the two tanks below.
- The collection tank 2 also has a manual drainage 10 which can be opened during maintenance operations to drain the water.
- The relay 6 and the float 9, which control switching on the pump 7 and the activation of the valve 8, can be mechanical or with electronic systems for controlling the liquid level in the respective tanks.
- The delivery of the pump 7 can flow directly into valve 8, using a 3-way valve.
- The float 4 is calculated with a volume such as to produce an upwards force sufficient to start raising the plug 5 only when the water that has flowed into the collection tank 2 has almost reached the maximum level, between h and H (FIG. 2). Only then will it start to raise the plug in proportion to the last rise in the water level. When, in this combined collection tank 2 filling up stage and contemporary drainage water discharge, the level slowly reaches the height H, the plug 5 will have reached its maximum opening, allowing the maximum downflow of the water from the purification tank 1 and/or the water from the shower or other drainages.
- Should the tank fill up too much, the overflow drainage 11 provides to drain off the excess water. Also setting the overflow drainage at height "h" it can serve as an automatic drainage of the "light dirt".
- The type of reservoir under the shower tray allows it to be placed in the normal bathroom floor thickness, hence allowing the external appearance of the bathrooms themselves to remain unaltered.
- The user of the bathrooms will be unaware of the use of recycled water, whose system is automatic and does not require any management intervention by the user. The system according to the invention, constituted of tanks and their purification and automatic activation of the drainage and of the supply of the tank, is described as installed under a shower tray. In actual fact, it can also be built independently or under other bathroom objects such as the bath tub.

In an improvement according to FIGS. 3 to 5, water for domestic use is stored in the collection tank 201 placed under the shower tray 211. The water is collected both directly by the shower drainage, with the shower tray placed above, and through the drainage of other fittings (wash basin, bidet . . . ) 300. The water coming from the shower is free from "heavy" dirt (hairs . . . ) as it passes through its own normal filter, and only the "light" dirt will pass through (froth . . . ). The water coming from 300 is directly drained into the decantation chamber 221, leaving the heavy dirt (hairs . . . ) in the filter tank 202, to be removed through occasional cleaning, and overflows through the weir 203 in the collection tank 201. When the water reaches the required limit value (8-20 cm) it overflows into the overflow tank 204 and comes out directly at drainage 301. The water from tank 201, containing only light dirt, that is, floating, passes under the weir 205, into the part of tank 220 where the pump 207 is positioned, but leaving on the other side all the light dirt that tends to flow out through the overflow 204 gradually as the water coming in exceeds the limit.

When the toilet flush button is activated connected with 303, the normal circulation water comes immediately through 304. At that moment, as the water is passing through, the relay flow sensor 206 closes the contact, hence controlling the closing of the supply valve 208 and activating the pump 207 at the same time. The float relay 209 allows to check that there is sufficient water in the tank 201 and 220 and otherwise does not allow the closing of the valve 208 (always open) or the pump 207. The no-return valve prevents water coming from 304 entering into 220 but goes only into 303.

In an embodiment all the operative elements of the water flow are positioned in the three chambers 220, 221, and 222. The filter tank 202 is placed in chamber 221 separated from 201 through the weir 203. The flow sensor 206 and the valve 208 are positioned in chamber 222, the only one not submersed in water. The pump 207 and the level sensor 209 are positioned in the chamber 220 where the weir 205 allows only clean water to pass through.

During normal operations the flush water is supplied through pump 207; when the flush independently closes its inlet, as it is already full, the water stops flowing from 303 and hence the flow sensor 206 reopens the contact stopping the pump and stopping supply to the valve 208. For maintenance, the cover covering the external part of the shower tray 220, 221 and 222 and containing all the operating parts can be opened. The tank 202 can also be removed for cleaning it from dirt accumulation.

KEY OF REFERENCE NUMBERS

201 Collection tank of height H (8-20 cm)
202 Removable heavy dirt collection tank
203 Weir on upper surface h (7-19 cm)
304 Overflow tank h (7-19 cm)
205 Weir for lower passage
206 Relay flow sensor (closes the contact when water passing through)
207 Pump 12/24 V
208 Valve always open (it closes if power supplied at 12/24 V)
209 Float relay (it opens the contact if the float is low—too little water)
210 No-return valve
211 Shower tray

220 Clean water chamber
221 Dirty water chamber for water coming in
222 Electrically operated control parts chamber
300 Inlet of water to be recycled, wash basin, bidet . . .
301 Drainage
303 Water pipe to toilet flush
304 Domestic water inlet

The invention claimed is:

1. System for the recovery of washing liquids used in showers, wash basins, and/or baths, said system comprising
  a first decantation tank provided with at least one inlet connected to a downflow point of washing water,
  a second collection tank,
  an overflow partition wall adapted to separate the two tanks,
  a sewer drainage at the bottom of the first decantation tank, adapted to be closed by a plug that is raised by a float in the second collection tank according to the liquid level therein,
  a drawing pump in the second collection tank, controllable by a relay, or electrical float, indicating liquid requirements of a fixture,
  a pipe connecting the pump of the second collection tank with the fixture, the relay, or electric float, is electrically connected with the pump and a valve of the fixture and is controlled by a float in the second collection tank for closing electrical power supply to the pump and opening electrical power supply of said valve for liquid flow to the fixture.

2. System according to claim 1, wherein the second collection tank is flushing system of the fixture.

3. System according to claim 1, wherein the downflow point is one of a shower, a wash basin, and a bath tub.

4. System according to claim 1, wherein the overflow partition wall has a small notch which lowers a height from H to h; part of the "heavy dirt" of the water remaining in the bottom of the first decantation tank by allowing the water to reach height H before opening the plug, and subsequently make the higher part of the water flow, passing from H to h, hence eliminating the "light dirt" parts (froth, lighter elements) of the water.

5. System according to claim 1, wherein the system is installed under a shower tray, or is built independently or under other bathroom fixtures.

6. System according to claim 1, wherein the first decantation tank slopes towards the plug so as to promote discharging of "heavy dirt".

7. System for the recovery of washing liquids used in showers, wash basins and/or baths, said system comprising
  a collection tank placed under a shower tray provided with at least one inlet connected to a downflow point of washing water,
  a decantation chamber of dirty water with a removable tank,
  an overflow partition wall,
  a drainage to a sewer,
  a weir for lower passage,
  a drawing pump,
  a pipe for domestic water inlet connected to the pump and to a fixture,
  a relay flow sensor electrically controlling the pump and a valve controlled by a relay float in the collection tank for interrupting electrical power supply to the pump and to the valve in case of lack of water in the collection tank, the sewer drainage being connected to the sewer through an overflow and the pump, and
  a no-return valve and the float relay being arranged in a chamber separate from the decantation chamber.

8. System according to claim 7, wherein all electrically operating parts are arranged in chambers next to the collection tank outside an area of the shower tray.

* * * * *